United States Patent [19]
Wier

[11] Patent Number: 6,155,727
[45] Date of Patent: Dec. 5, 2000

[54] BUCKLE TENSIONER

[75] Inventor: Franz Wier, Göggingen, Germany

[73] Assignee: TRW Occupant Restraint Systems GmbH & Co. KG, Alfdorf, Germany

[21] Appl. No.: 09/190,089

[22] Filed: Nov. 12, 1998

[30] Foreign Application Priority Data

Nov. 14, 1997 [DE] Germany ............... 297 20 213 U

[51] Int. Cl.[7] ................................................ B60R 22/46
[52] U.S. Cl. ........................... 397/480; 280/806; 60/638; 297/479
[58] Field of Search ................... 297/480, 479; 280/806; 60/632, 638

[56] References Cited

U.S. PATENT DOCUMENTS

| | | | |
|---|---|---|---|
| 4,934,030 | 6/1990 | Spinosa et al. | ............ 280/806 X |
| 5,531,479 | 7/1996 | Bauer | ............ 280/806 |
| 5,568,940 | 10/1996 | Lane, Jr. | ............ 297/480 X |
| 5,607,185 | 3/1997 | Isaji et al. | ............ 297/480 X |
| 5,871,235 | 2/1999 | Wier | ............ 280/806 |
| 5,927,756 | 7/1999 | Wier | ............ 280/806 |

*Primary Examiner*—Peter M. Cuomo
*Assistant Examiner*—Stephen Vu
*Attorney, Agent, or Firm*—Tarolli, Sundheim, Covell, Tummino & Szabo L.L.P.

[57] ABSTRACT

A buckle tensioner for a belt buckle arranged adjacent to a vehicle seat includes a piston/cylinder unit with a cylinder having an interior and with a piston arranged in the interior, and an elastically deflectable traction transfer device connecting the piston and the belt buckle. The traction transfer device offers a smaller resistance to a deflection of the belt buckle towards the vehicle seat than to a deflection away from the vehicle seat.

24 Claims, 2 Drawing Sheets

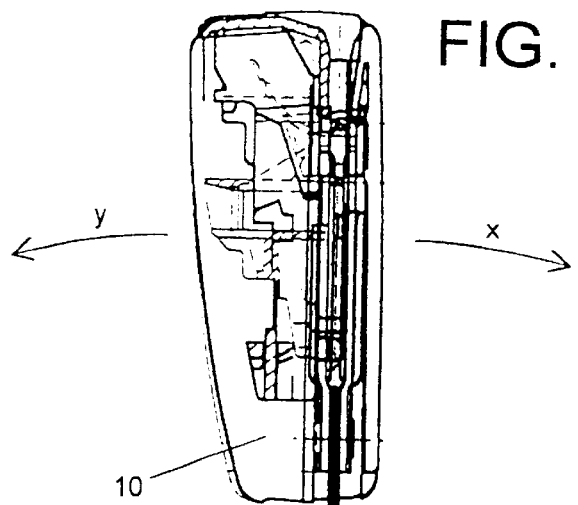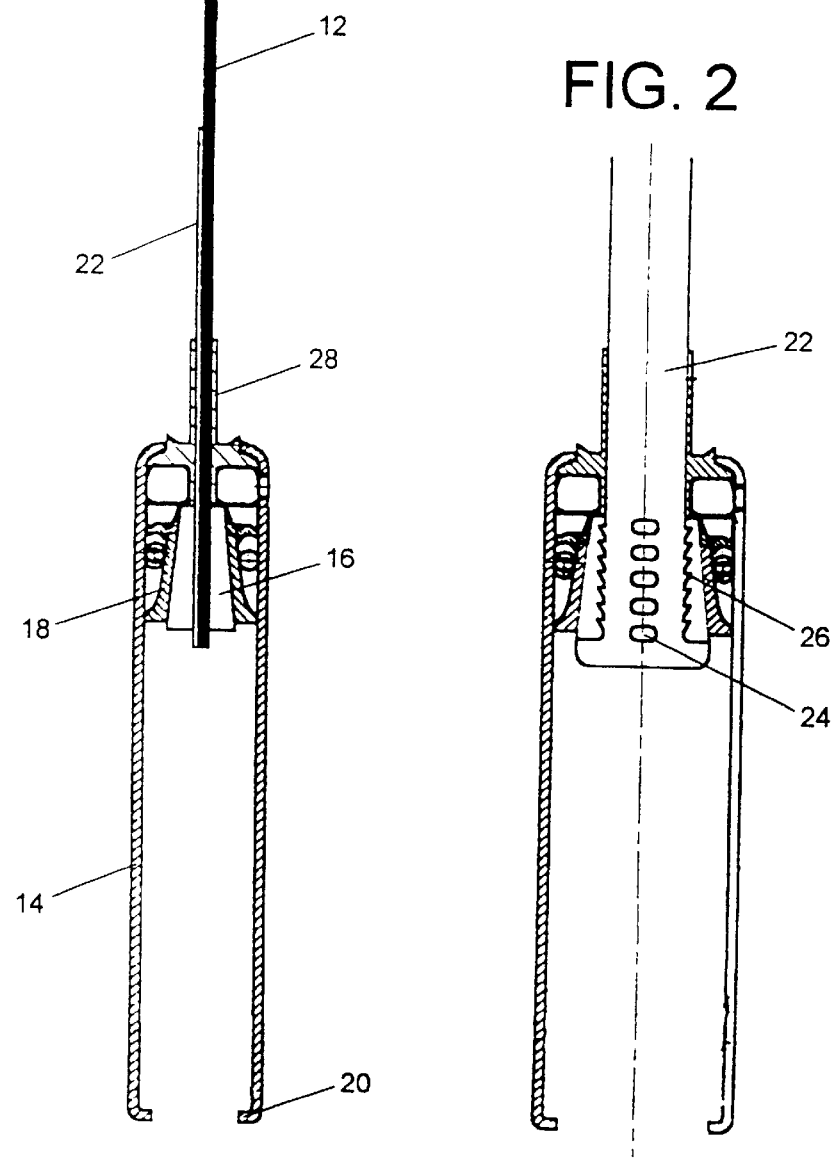

BUCKLE TENSIONER

TECHNICAL FIELD

The invention relates to a buckle tensioner for a belt buckle.

BACKGROUND OF THE INVENTION

In safety belt systems which have a belt tensioning device with a piston/cylinder unit, usually a flexible traction cable is used as traction transfer means between the piston of the tensioning device and the belt buckle. The flexible traction cable serves at the same time as an anchoring for the belt buckle and, in the buckled-up condition,, makes possible an alignment of the belt buckle for approximation to the belt webbing course. The smaller the resistance to bending of the traction cable, the better occurs the adaptation of the orientation of the belt buckle to the belt webbing course. However, on insertion of the insert tongue into the belt buckle, a too small bending resistance of the anchoring proves to be a disadvantage because the belt buckle can easily move laterally.

BRIEF SUMMARY OF THE INVENTION

The invention provides a buckle tensioner which permits an optimum alignment of the belt buckle. The belt buckle does not move in the direction away from the vehicle seat on insertion of the insert tongue, but nevertheless easily adapts itself to the belt webbing course in the buckled-up condition. The buckle tensioner according to the invention is arranged adjacent to a vehicle seat and includes a piston/cylinder unit with a cylinder having an interior and with a piston arranged in the interior, and an elastically deflectable traction transfer device connecting the piston and the belt buckle. The traction transfer device offers a smaller resistance to a deflection of the belt buckle towards the vehicle seat than to a deflection away from the vehicle seat.

The adapting of both the belt buckle and the traction transfer means to the course of the safety belt can be improved in that the traction transfer means offers a smaller resistance to a deflection of the belt buckle in the longitudinal direction of the vehicle, i.e. in the direction of the front of the vehicle or rear of the vehicle, than to a deflection towards the vehicle seat.

According to a preferred embodiment of the invention, the buckle tensioner has an elastically deflectable support part which adjoins the traction transfer means on the side facing away from the vehicle seat and supports the traction transfer means in the direction away from the vehicle seat. Thereby, the resistance to bending of the traction transfer means in the direction away from the vehicle seat is increased, which prevents too easy a deflection of the belt buckle on insertion of the insert tongue. On the other hand, the belt buckle can be adjusted towards the vehicle seat without the application of greater forces. When buckled up, this is a precondition for an optimum belt webbing course.

A simple possibility for coupling the support part and the traction transfer means with each other consists in constructing both as a leaf spring and securing them to each other in such a manner that a leaf spring assembly is produced. The piston is secured to the leaf spring or to the leaf spring assembly preferably by pressing the piston or a part of the piston onto one end of the traction transfer means. A particularly stable connection between piston and traction transfer means is produced by providing recesses in the traction transfer means, into which the pressed-on piston or the pressed-on part of the piston at least partially penetrates. In this way, a form-fitting connection is produced. In addition, the traction transfer means and/or the support part can be constructed as a leaf spring assembly.

The buckle tensioner can have a cylinder with a circular cross-section or can have a cylinder which is oval in cross-section, with a correspondingly shaped piston. A rectangular cylinder is also conceivable. The shape of the cylinder is to be selected such that in particular a buckle tensioner is produced which takes up a small overall space. In particular, the shape of the cylinder is also to take into account the cross-sectional shape of the traction transfer means, i.e. if for example a traction transfer means is provided which is elongated in cross-section, the cylinder can be likewise elongated in cross-section, for example it can be oval or rectangular.

DETAILED DESCRIPTION OF THE DRAWINGS

Figure 3:
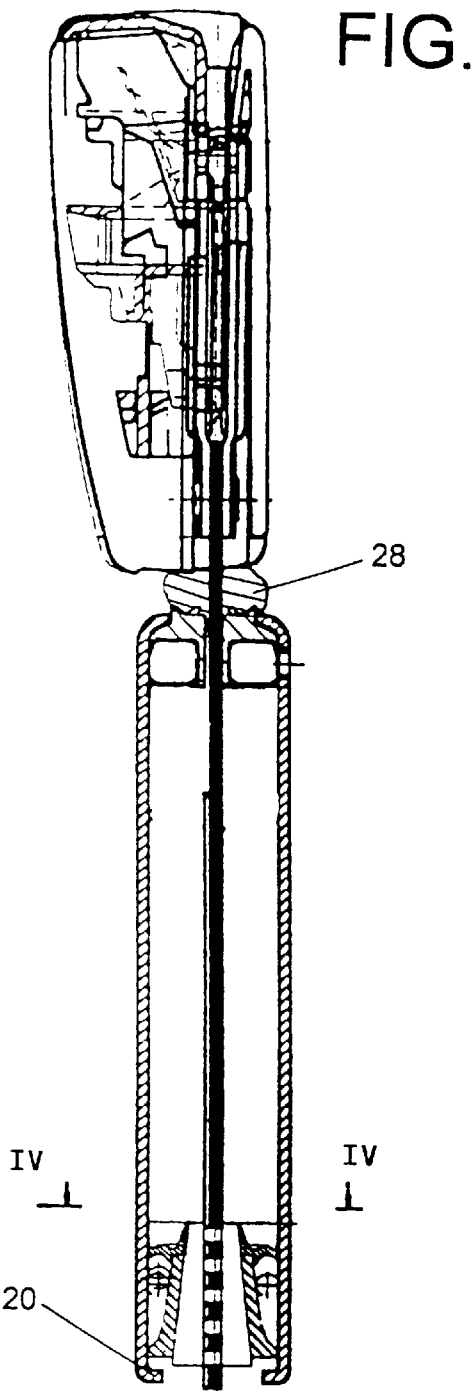
Figure 4:
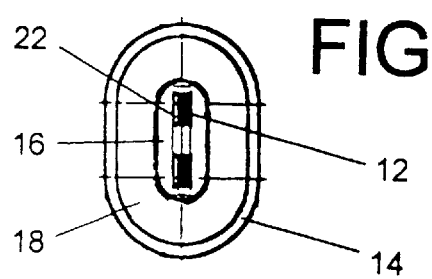

FIG. 1 shows a longitudinal sectional view through a belt buckle and through a buckle tensioner according to a preferred embodiment of the invention, connected with the belt buckle via a traction transfer means, before a tensioning action, FIG. 2 shows a longitudinal sectional view of the buckle tensioner of FIG. 1 in a sectional plane 90° to that of FIG. 1, FIG. 3 shows a longitudinal sectional view through the buckle tensioner according to FIG. 1 towards the end of a tensioning process, and FIG. 4 shows a section according to line IV—IV in FIG. 3, which shows the piston of the buckle tensioner.

DETAILED DESCRIPTION OF A PREFERRED EMBODIMENT

In FIG. 1 a belt buckle 10 is illustrated, which is coupled with a buckle tensioner by means of a traction transfer means 12. The buckle tensioner has a piston/cylinder unit which is anchored directly or indirectly on the floor of the vehicle. A piston displaceably arranged inside the cylinder 14 is firmly connected with the traction transfer means 12. In the illustrated embodiment, the piston is constructed in two parts and consists of an inner part 16 and of an outer part 18, surrounding this inner part 16 and detachably connected therewith. The inner part 16 can be a cone with a round cross-section or, as can be seen in FIG. 4, with an oval cross-section for the space-saving accommodation of the traction transfer means 12 which is elongated in cross-section. Preferred materials for the part 16 are aluminum and brass. The cylinder 14, which is open on the side facing away from the belt buckle, has a stop 20 at the lower end, the internal diameter of which is greater than that of the inner part 16 but smaller than that of the outer part 18.

A further leaf spring, which serves as support part 22, fits closely against the traction transfer means 12 on the side facing away from the vehicle seat, which traction transfer means 12 is constructed as a leaf spring assembly in the illustrated embodiment. As can be seen from FIG. 1, the leaf spring assembly faces the movement directions X and Y with its broader sides. Through the dimensioning and selection of material of the leaf spring assembly, the resistance to bending can be set as desired. Here, the support part 22 is only connected with the inner part 16 of the buckle tensioner, however not with the belt buckle 10 like the traction transfer means 12. Both the traction transfer means 12 and also the support part 22 have several recesses 24 at their end on the piston side and a toothing 26 on their narrow outer sides, as can be seen in FIG. 2. The inner part 16 of the piston is pressed onto the traction transfer means 12 and the support part 22. In so doing, the pressed-on part 16 penetrates into the recesses 24 and also between adjacent teeth, so that a form-fitting connection is produced.

The buckle tensioner also has a damping device. For this, a sleeve 28 surrounding the traction transfer means 12 and the support part 22 is arranged on the end wall of the cylinder 14 on the belt buckle side. A preferred material for the sleeve 28 is aluminum. The sleeve can also be pressed in the non-activated state of the buckle tensioner directly onto the traction transfer means 12 and the support part 22 in a pressure- and gas-tight manner.

On buckling up, the vehicle occupant can easily insert the insert tongue of the safety belt into the belt buckle 10, because the support part 22 stabilizes the position of the belt anchoring, which is formed by the traction transfer means 12, in y-direction, i.e. away from the vehicle seat, whereby a lateral movement of the belt buckle 10 is prevented. On the other hand, the adjustment in x-direction, i.e. towards the vehicle seat, does not affect the support part 22. The flexibility of the traction transfer means 12 can therefore be designed to be so great that in the buckled-up condition, an optimum belt webbing course can appear.

In the case of restraint, a propellant charge inside the cylinder 14 is ignited in a conventional manner, whereby the parts 18 and 16 of the piston and also the support part 22 coupled thereto, the traction transfer means 12 and the belt buckle 10 are shifted downwards. Close before the end of the tensioning path, the belt buckle 10 strikes against the sleeve 28 and deforms it plastically, whereby a portion of the energy us is absorbed and tension peaks are reduced.

As can be seen from FIG. 3, the piston has reached the lower end of the cylinder 14 approximately when the sleeve 28 is completely compressed plastically. As soon as the outer part 18 strikes against the stop 20 of the cylinder housing 14, the inner part 16 detaches from the outer part 18, so that the part 18 is uncoupled from the traction transfer means 12 and the belt buckle 10. Thereby, the parts which are uncoupled from each other can be braked and damped separately from each other, whereby a smaller overall space is required. The tensioning path is limited by the striking of the part 18 against the lower stop 20; during the subsequent further movement of the traction transfer means 12 and of the belt buckle 10, these elements are delayed.

I claim:

1. A belt tensioner arrangement, comprising:
   a belt buckle, and
   a buckle tensioner having a piston/cylinder unit wit a cylinder having an interior and with a piston arranged in said interior, and
   an elastically deflectable traction transfer means connecting said piston and said belt buckle,
   said traction transfer means offering a smaller resistance to a deflection of said belt buckle towards a vehicle seat than to a deflection away from the vehicle seat,
   said traction transfer means having a side facing away from the vehicle seat and said traction transfer means being-adapted to be supported on said side facing away from the vehicle seat by an elastically deflectable support part,
   said support part being formed by at least one leaf spring.

2. The belt tensioner arrangement as set forth in claim 1, wherein said traction transfer means is formed by at least another leaf spring.

3. The belt tensioner arrangement as set forth in claim 1, wherein at least one of said traction transfer means and said support part are constructed as a leaf spring assembly.

4. The belt tensioner arrangement as set forth in claim 1, wherein said traction transfer means and said support part together form a leaf spring assembly.

5. A belt tensioner arrangement, comprising:
   a belt buckle, and
   a buckle tensioner having a piston/cylinder unit with a cylinder having an interior and with a piston arranged in said interior, and
   an elastically deflectable traction transfer means connecting said piston and said belt buckle,
   said traction transfer means offering a smaller resistance to a deflection of said belt buckle towards a vehicle seat than to a deflection away from the vehicle seat,
   wherein one of said piston and a part of said piston is pressed onto said traction transfer means,
   said traction transfer means having recesses into which one of said pressed-on piston and said pressed-on part of said piston at least partially penetrates, in order to achieve a form-fitting connection.

6. The belt tensioner arrangement according to claim 5, wherein said recesses are formed by a toothing on outer walls of said traction transfer means.

7. A belt tensioner arrangement, comprising:
   a belt buckle, and
   a buckle tensioner having a piston/cylinder unit with a cylinder having an interior and with a piston arranged in said interior, and
   an elastically deflectable traction transfer means connecting said piston and said belt buckle,
   said traction transfer means offering a smaller resistance to a deflection of said belt buckle towards a vehicle seat than to a deflection away from the vehicle seat.

8. The belt tensioner arrangement as set forth in claim 1, wherein said traction transfer means offers a smaller resistance to a deflection of said belt buckle in a longitudinal direction of the vehicle than to a deflection towards the vehicle seat.

9. The belt tensioner arrangement as set forth in claim 1, wherein said traction transfer means has a side facing away from the vehicle seat and wherein said traction transfer means is adapted to be supported on said side facing away from the vehicle seat by an elastically deflectable support part.

10. The belt tensioner arrangement as set forth in claim 9, wherein said support part is formed by at least one leaf spring.

11. The belt tensioner arrangement as set forth in claim 10, wherein at least one of said traction transfer means and said support part are constructed as a leaf spring assembly.

12. The belt tensioner arrangement as set forth in claim 10, wherein said traction transfer means and said support part together form a leaf spring assembly.

13. The belt tensioner arrangement as set forth in claim 1, wherein said traction transfer means is formed by at least another leaf spring.

14. The belt tensioner arrangement as set forth in claim 1, wherein one of said piston and a part of said piston is pressed onto said traction transfer means.

15. The belt tensioner arrangement as set forth in claim 14, wherein said traction transfer means has recesses into which one of said pressed-on piston and said pressed-on part of said piston at least partially penetrates, in order to achieve a form-fitting connection.

16. The belt tensioner arrangement as set forth in claim 15, wherein said recesses are formed by a toothing on outer walls of said traction transfer means.

17. The belt tensioner arrangement as set forth in claim 1, wherein one of said piston and a part of said piston consists of aluminum.

18. The belt tensioner arrangement as set forth in claim 1, wherein one of said piston and a part of said piston consists of brass.

19. The belt tensioner arrangement as set forth in claim 1, wherein, on activation of said tensioner, said piston is displaced along a tensioning path and is decelerated at an end of said tensioning path, wherein said piston is constructed in several parts, and wherein a part of said piston secured to said traction transfer means is uncoupled from the remaining piston at said end of said tensioning path and upon deceleration of said piston.

20. The belt tensioner arrangement as set forth in claim 19, wherein said part of said piston secured to said traction transfer means is a cone which is received in a correspondingly shaped recess.

21. The belt tensioner arrangement as set forth in claim 1, wherein on activation of said tensioner, said piston is displaced along a tensioning path and is decelerated at an end of said tensioning path, wherein a damping device for the absorption of energy on deceleration of the movement of said belt buckle is provided, said device has a sleeve-shaped section on an end face of said cylinder facing said belt buckle, wherein said section is plastically deformed on striking of said belt buckle onto it at said end of said tensioning path.

22. The belt tensioner arrangement as set forth in claim 21, wherein said sleeve-shaped section is pressed in a pressure and gas-tight manner onto said traction transfer means in a non-activated state of said belt tensioner.

23. The belt tensioner arrangement as set forth in claim 22, wherein said sleeve-shaped section consists of aluminum.

24. The belt tensioner arrangement as set forth in claim 1, wherein said cylinder has an oval cross-sectional shape and said piston has a corresponding oval outer contour lying against an inner face of said cylinder.

\* \* \* \* \*